Figure 1:
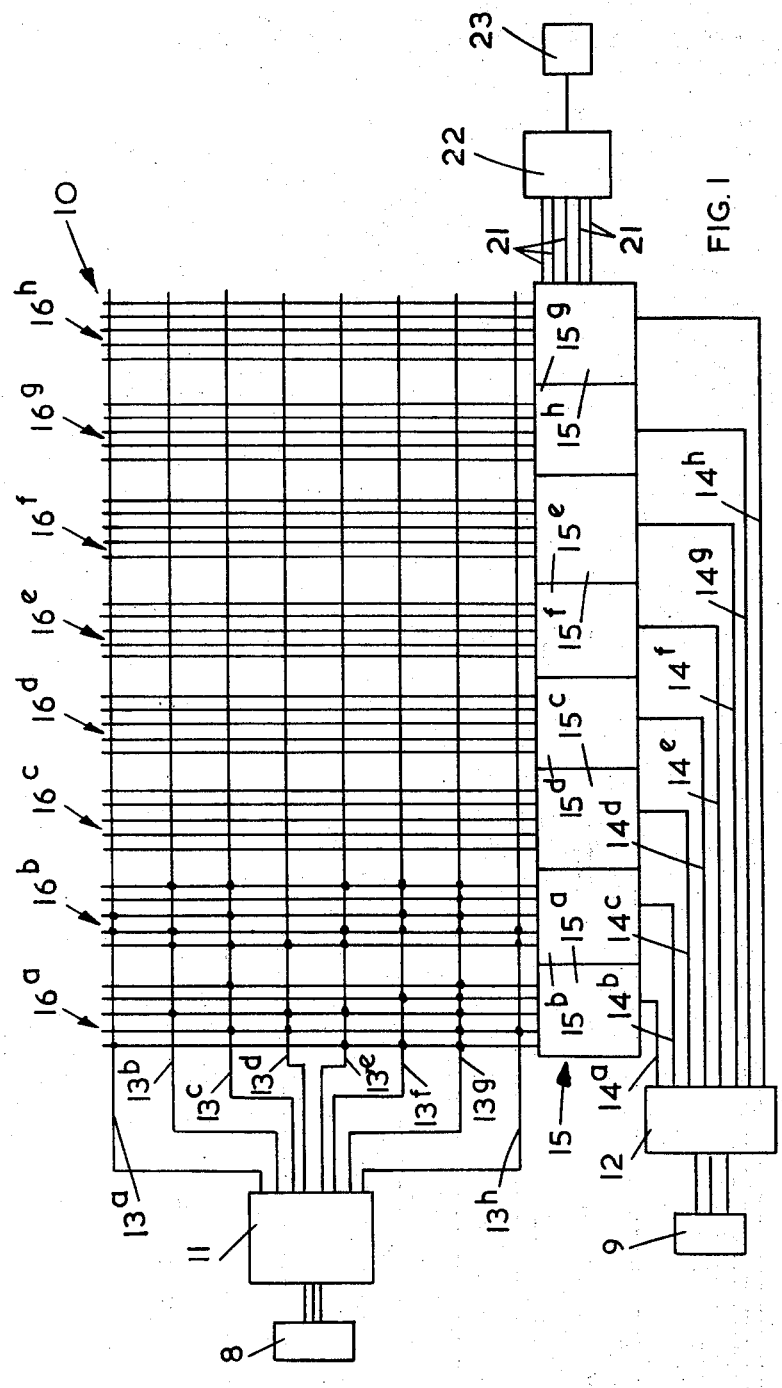

United States Patent [19]
Ironside et al.

[11] 3,824,574
[45] July 16, 1974

[54] PROCESS CONTROL APPARATUS

[75] Inventors: John Michael Ironside, Birmingham; Duncan Barry Hodgson, Leamington; Michael Herbert Cops; Malcolm Williams, both of Solihull, all of England

[73] Assignee: Joseph Lucas (Electrical) Limited, Birmingham, England

[22] Filed: Dec. 21, 1972

[21] Appl. No.: 317,433

[30] Foreign Application Priority Data
Dec. 21, 1971   Great Britain .................... 59507/71

[52] U.S. Cl. .......................... 340/213 Q, 340/172
[51] Int. Cl. ............................................. H04q 9/06
[58] Field of Search ................ 340/213 Q, 409, 172

[56] References Cited
UNITED STATES PATENTS
2,897,638   8/1959   Maker ............................ 340/213 Q
3,075,700   1/1963   Bishop .......................... 340/213 Q Primary Examiner—John W. Caldwell
Assistant Examiner—Marshall M. Curtis
Attorney, Agent, or Firm—Holman & Stern

[57] ABSTRACT

This invention relates to process control apparatus in which two parameters of a process are measured, and fed to a memory unit which produces an output pulse of length dependent on the values of the two parameters, the output pulse being used to control the process. One of the inputs to the memory unit is varied in a non-linear manner so that the accuracy with which the memory unit defines the pulse length is increased.

2 Claims, 8 Drawing Figures

PROCESS CONTROL APPARATUS

This invention relates to process control apparatus.

Apparatus according to the invention comprises in combination a first transducer producing a first signal representing a first parameter relating to the process being controlled a second transducer producing a second signal representing another parameter relating to the process being controlled, a memory unit, first control means providing to said memory unit a first digital input signal which varies with said first signal, second control means providing to said memory unit a second digital input signal which varies with said second signal, said memory unit producing an output dependent on the values of said first and second digital input signals, and control means producing an output pulse of length, controlled by the output of the memory unit, said pulse being used to control said process, at least one of said control means providing to the memory unit a digital input signal which varies with the appropriate signal in a non-linear manner so that the accuracy with which the memory unit defines the pulse length is increased.

The invention further resides in process control apparatus comprising in combination a matrix unit having a first set of input lines, and a second set of input lines arranged in groups of n lines, where n is at least two, with each line in the second set crossing each line in the first set and connections being made between lines in the first and second sets in accordance with the process being controlled, a first transducer producing an electrical signal representing a first parameter relating to the process, first control means whereby the output from the first transducer energises one of the lines in the first set, depending on the value of the parameter, a second transducer producing an electrical signal representing a second parameter relating to the process, second control means whereby the output from the second transducer energises one of the groups of n lines in the second set of input lines, and process control means having n input connections the first of which is connectible to the first line in each group of n lines, the second of which is connectible to the second line in each group of n lines and so on, the arrangement being such that at any instant the energised group of n lines is connected to the process control means so that for given values of the two parameters the process control means receives a n-bit digital input signal, dependent on the inter-connections between the energised line in the first set and the energised group of lines in the second set, the process control means serving to determine the length of a pulse used to control the process and at least one of said control means serving to energise the lines in such a manner that if a graph is drawn of the length of the output pulse against the value of the appropriate parameter, the change in parameter which is required to change the energised line is smallest where the required rate of change of the length of the output pulse is greatest, and greatest where the required rate of change of the length of the output pulse is least.

Figure 2:
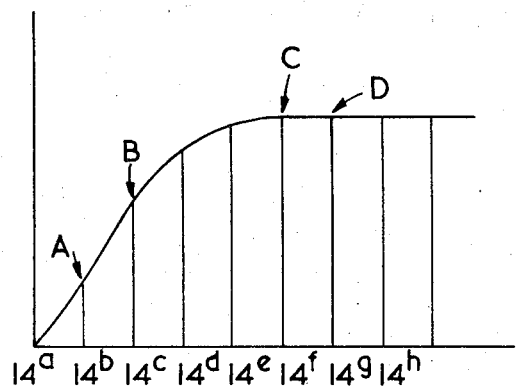
Figure 3:
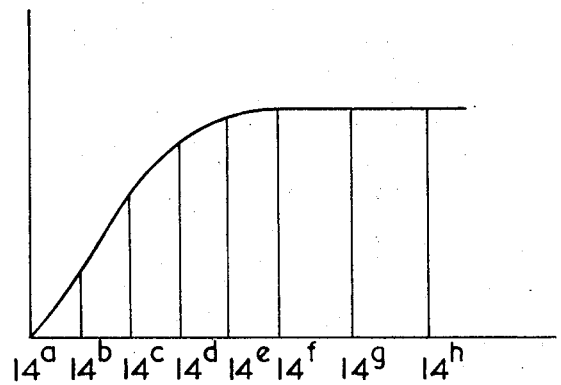
Figure 4:
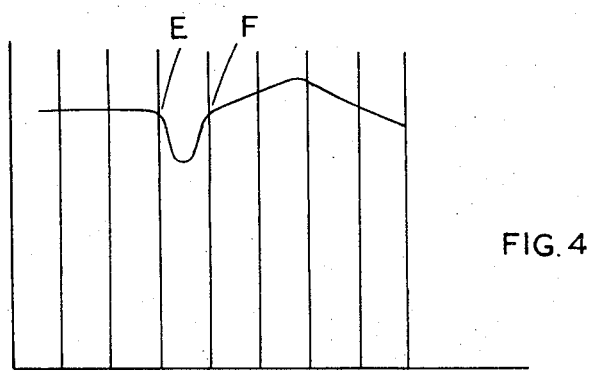
Figure 5:
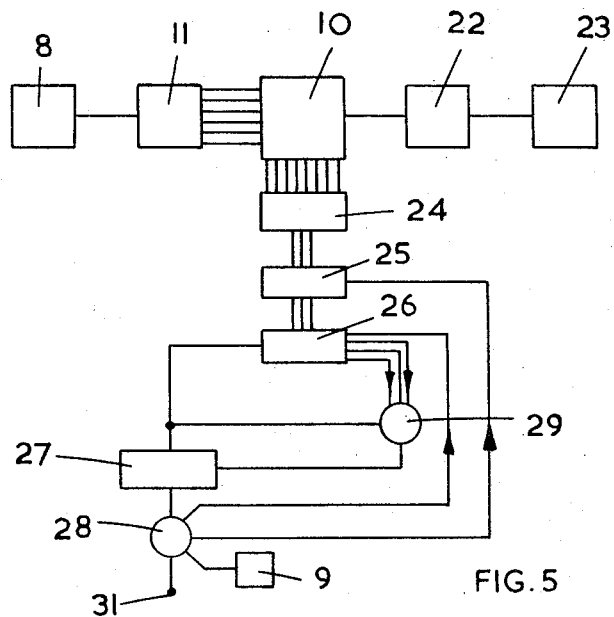
Figure 6:
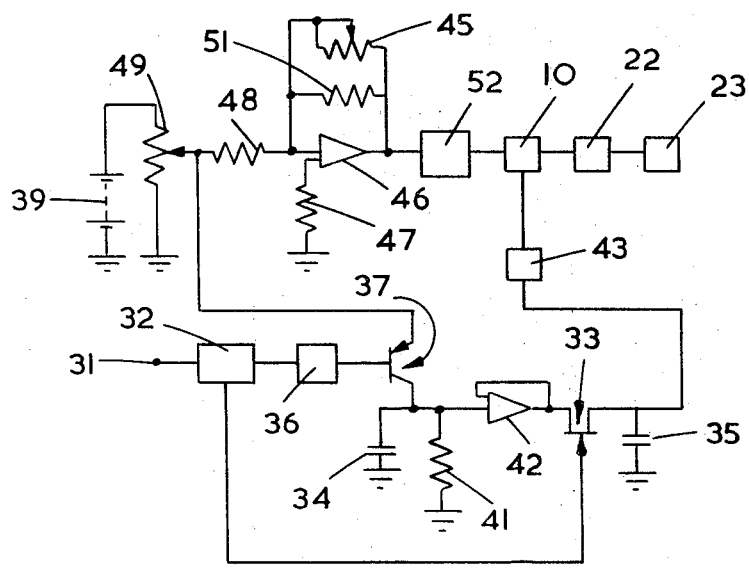
Figure 7:
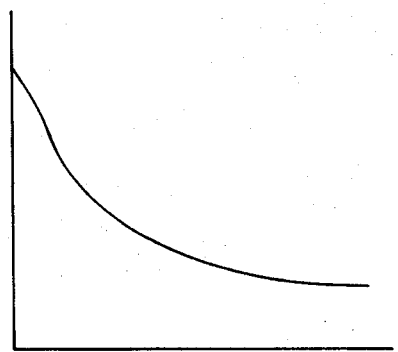
Figure 8:
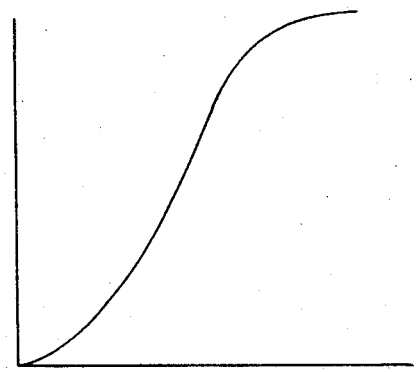

The way in which the accuracy of the system is improved will become apparent after considering the examples of the invention illustrated in the accompanying drawings, in which:

FIG. 1 is a block diagram of a process control apparatus according to one example of the invention, FIGS. 2 to 4 are graphs illustrating various requirements of the process, FIGS. 5 and 6 are block diagrams in accordance with two further examples of the invention, and FIGS. 7 and 8 are graphs illustrating the operation of the arrangement shown in FIG. 6.

In the drawings, a process to be controlled requires an input in the form of pulses the duration of which determines the progress of the process, and is to be governed by the values of two parameters associated with the process.

Referring now to FIG. 1, there is provided a transducer 8 which produces an electrical signal representing a first parameter of the process to be controlled. The electrical signal from the transducer 8 is in the form of a three bit binary word which is fed to control means 11 which serves to energise one of 8 input lines 13a, to 13h, the input lines 13a to 13h forming part of a memory unit 10. The memory unit 10 further includes 8 sets of input lines 16a to 16h, each of the lines 13a to 13h crossing each of the sets of lines 16a to 16h. Although in the example shown there are 8 input lines 13 and 8 sets of lines 16, it will be appreciated that the number of lines can be more or less than this figure. Moreover, although in the example shown each set of lines 16 contains 5 lines, there can be more or less lines in each set 16.

There is further provided a second transducer 9 which produces an electrical signal representing a second process parameter, the signal being in the form of a three bit binary word which is fed to control means 12, which energises one of a set of lines 14a to 14h. The lines 14a to 14h are connected to a switching device 15 having 8 sets of switches 15a to 15h respectively. The arrangement is such that when a signal appears on the line 14a, the switches 15a connect the lines 16a to five output lines 21 coupled to a decoder 22, the output from which is fed to means 23 determining the length of the output pulse controlling the process.

The lines 16 and 13 are interconnected by diodes in an empirically determined manner depending on the process being controlled. In FIG. 1, the connections between the first two sets of lines 16a and 16b and the lines 13 are shown, each dot representing a diode connection. Suppose that the value of the first parameter is such that the line 13a is energised, and the second parameter is such that the line 14a is energised, then the switches 15a connect the lines 16a to the decoder 22, and the decoder 22 will receive a signal of the form 10,000, where 1 represents the diode connection between the line 13a and the first of the set of lines 16a. If the parameters now change in such a manner that the line 13g and the line 14b are energised, then the decoder 22 will receive a signal 01111. Thus it will be appreciated that the memory unit 10 produces an output dependent on the two input signals controlled by the decoders, and controls the output pulse length in accordance with the pre-set connections within the memory unit 10.

With the arrangement shown in FIG. 1, the control means 11 and 12 are both simple decoders which convert the binary words produced by the transducers 8 and 9 into digital signals each to energise one of 8 lines. With such an arrangement the accuracy for a given memory unit 10 is restricted, as will be apparent from a consideration of FIGS. 2 and 3. Referring to FIG. 2 the graph shown illustrates roughly a general type of curve which is applicable to numerous processes, with one parameter plotted against required output pulse length for a particular value of the second parameter. The parameter axis is divided into sections which are labelled 14a to 14h corresponding to the lines 14a to 14h in FIG. 1. It will be seen that when the line 14b is energised the pulse length will be determined by point A in the graph shown in FIG. 2, and the pulse length will stay at point A until the line 14c is energised, giving quite a large inaccuracy in view of the slope of the graph between points A and B. On the other hand, between points C and D the pulse length varies by only a very small amount, but nevertheless the portion of the graph between C and D and further on from D is catered for by the lines 14f, 14g, and 14h, which are therefore wasted. The problem of the inaccuracy between points A and B could of course be dealt with by providing a much larger matrix, so that although the lines 14 in the matrix are still equi-spaced, there are far more of them so that the control is more accurate. This would lead to an extremely complicated matrix, and so at least one of the control means is designed to provide a non-linear relationship between the value of the electrical signal being measured and the digital input to the memory unit. The effect of this is shown diagrammatically in FIG. 3 where it will be seen that the lines 14a to 14f are now much closer together, with the lines 14g and 14h spaced further apart. Obviously the arrangement can be varied to suit the particular application, and FIG. 4 shows an imaginary curve with pulse length on the vertical axis and one of the process parameters on the horizontal axis. With a curve of this form, which can be obtained with some processes, there is a sharp discontinuity between points E and F which without the invention is not catered for at all.

As an example of the way in which the spacings can be modified in the manner shown in FIG. 3 reference is directed to FIG. 5. The input to the memory unit 10 by way of the transducer 8 and the control means 11 is unchanged, as is the output from the memory unit 10 by way of the decoder 22 and means 23. However, the control means 12 in FIG. 1 is now considerably more complex, and includes a decoder 24 providing the input to the memory unit 10 by way of 8 lines corresponding to the lines 14a to 14h, a store 25 providing a 3 bit input to the decoder 24 and itself receiving a three bit binary input from a counter 26, a further counter 27 coupled to the counter 26 and having a feedback connection from the counter 26 to the counter 27 through a gate 29, the counter 27 being fed from terminal 31 with a signal of fixed frequency and pulse width, and a transducer 9 providing a signal at unknown time intervals determined by the parameter, the transducer 9 in conjunction with the signal from terminal 31, operating the switches 28.

In order to understand the operation of the control means in FIG. 5, consider first the arrangement of the counters 27 and 26. In the particular example being described, the counter 26 is a three stage binary counter giving a three bit output. The input to the counter 26 is provided by the counter 27 which has the property that it produces an output when it has received a predetermined number of input signals. The counter could, for example, be another three bit binary counter which counts down to zero producing an output each time the counter returns to zero. Thus, assuming that pulses are applied to the counter 27, initially at 111, at a fixed frequency, then when 7 pulses have been received by the counter 27 it produces an output and steps the counter 26 once. However, the feedback connection by way of the gate 29 serves to set the counter 27 in accordance with the reading of the counter 26. Assuming that the counter 26 started with the reading of 000, then after seven pulses have been received by the counter 27, the counter 26 will be 001. The feedback connection may now be such that the reading 001 causes the counter 27 to be set to read 110. In these circumstances, the counter 27 now only needs 6 input pulses before it steps the counter 26 again. The counter 26 will now read 010, and may set the counter 27 to read 101, so that only 5 input pulses are now required before the counter 27 steps the counter 26 again. The figures of course are only by way of example, the counter 26 being able to set the counter 27 to any reading for any reading of the counter 26 according to the information at the gate 29, but the overall effect is that, although a graph of the number of pulses received by the counter 27 against time is a straight line the equivalent graph for the counter 26 will be a curve the shape of which is determined by the feedback connection. The gate 29 may be in the form of a memory, being addressed by the output from the counter 26 and giving an output to set the counter 27, each time an output appears from counter 27, to the desired state.

The three switches 28 are operated in turn in synchronism with the signal 31, each time a signal appears from transducer 9, the first switch closes and prevents any further signals appearing at the output of the counter 27 by holding the counter 27 at a state determined by the first predetermined number required. The first switch remains closed until the second and third switches have operated. The second switch transfers the information in counter 26 to store 25. The third switch then resets counter 26 to zero. The first switch now opens and allows the counter 27 to continue counting and producing input pulses to counter 26. However, the signal stays in the store 25 and is supplied by way of the decoder 24 to the memory unit 10 until the end of the next unknown time interval. During the next unknown time interval, the second parameter may have changed so that a different number of pulses are fed to the counter 26. At the end of this next unknown time interval, the information in the store 25 is replaced by the new information in the counter 26 and then the counter 26 and the counter 27 are re-set to zero again, and the new information in the store 25 is used until the end of the next unknown time interval. The arrangement continues to operate in this way and it will be appreciated that for any given value of the second parameter, the counter 26 will, at the end of each unknown time interval have a reading which is determined by the nature of the feedback circuit, which can be designed to give, for example, the type of spacing shown in FIG. 3.

Referring now to FIG. 6, the arrangement is such that when an output pulse is required to be supplied to control the process a pulse appears at a terminal 31, this pulse serving to trigger a monostable circuit 32, the output from which is a pluse which turns on a field effect transistor 33. The capacitor 35 charges to the voltage on the output of amplifier 42. The amplifier 42 is connected such that the voltage on the output is always the same as that at the input, hence whilst transistor 33 is conducting then the voltage on capacitor 35 is the same as that on capacitor 34.

The trailing edge of the pulse from the monostable circuit 32 triggers a second monostable circuit 36, which conducts for a period of time during which it turns on a transistor 37, the emitter of which is connected to a fixed reference voltage. While the monostable circuit 36 is producing an output, the transistor 37 allows charging of the capacitor 34 to a predetermined voltage. At the end of the period of the monostable circuit 36, transistor 37 turns off and the capacitor 34 discharges through a resistor 41, and continues to discharge until monostable 36 is retriggered in the manner previously described.

FIG. 7 shows a graph of pulse length against parameter for a fixed value of the second parameter in the process to be controlled in FIG. 6. Comparing FIG. 7 with FIGS. 2 and 3 it will be appreciated that it is desirable to have unequal increments along the parameter axis in FIG. 7 as described for FIG. 3.

If a graph of voltage on a discharging capacitor is plotted against the reciprocal of time then a graph of the shape shown in FIG. 8 is produced. It will be noticed that for equal increments on the x-axis, unequal increments are produced in the y-axis. Hence if this characteristic is used to modify the distribution of increments along the parameter axis in FIG. 7, more equal increments of pulse length will result. At the instant when the pulse appears at the terminal 31, the voltage across capacitor 34 will represent the parameter, and this voltage is transferred by way of an amplifier 42 to the capacitor 35, the output from which is sensed by a device 43 which energises the memory unit 10 by way of one of the 8 lines 14a to 14h as shown in FIG. 1. It will be appreciated that the voltage transferred to the capacitor 35 will not vary with the parameter in a linear fashion, but in a non-linear fashion which, as stated above, approximates closely to the requirement for changing pulse length as the parameter varies. Thus, the digital input to the memory unit 10 is varied automatically in the required manner, to achieve the effect shown in FIG. 3.

In FIG. 6, the input to the memory unit is also varied in a non-linear fashion in accordance with a second parameter of the process. The second parameter controls a slider movable over a resistor 45 connected across an amplifier 46 one input terminal of which is earthed through a resistor 47 and the other input terminal of which is connected through a resistor 48 to a reference voltage. A further resistor 51 is connected in parallel with the resistor 45. The output from the amplifier 46 is fed through a device 52 which energises one of the input lines of the memory unit 10. The lines concerned being those marked as 13a to 13h in FIG. 1.

Ignoring for the moment the resistors 51 and 47, it will be seen that the output from the amplifier 46 will be directly proportional to the value of the second parameter, which causes movement of the slider over the resistor 45. However by suitable choice of the ratio of resistors 51 and 48, which is a simple matter for a given process, it can be arranged that the voltage applied to the device 52 varies in a non-linear manner with the second parameter.

We claim:

1. A process control apparatus comprising in combination a first transducer producing a first signal representing a first parameter relating to the process being controlled, a second transducer producing a second signal representing another parameter relating to the process being controlled, a memory unit, first control means coupled to said first transducer and providing to said memory unit a first digital input signal which varies with said first signal, second control means coupled to said second transducer and providing to said memory unit a second digital input signal which varies with said second signal, said memory unit producing an output dependent on the values of said first and second digital input signals, and control means producing an output pulse of length controlled by the output of the memory unit, said pulse being used to control said process, said second control means incorporating a function generator whereby said second control means provides to the memory unit a digital input signal which varies with the appropriate signal in a non-linear manner so that the accuracy with which the memory unit defines the pulse length is increased.

2. A process control apparatus comprising in combination a matrix unit having a first set of input lines, and a second set of input lines arranged in groups of n lines, where n is at least two, with each line in the second set crossing each line in the first set and connections being made between lines in the first and second sets in accordance with the process being controlled, a first transducer producing an electrical signal representing a first parameter relating to the process, first control means interconnecting the first transducer and matrix unit whereby the output from the first transducer energises one of the lines in the first set, depending on the value of the parameter, a second transducer producing an electrical signal representing a second parameter relating to the process, second control means interconnecting the second transducer and matrix unit whereby the output from the second transducer energises one of the groups of n lines in the second set of input lines, and process control means having n input connections the first of which is connectible to the first line in each group of $n$ lines, the second of which is connectible to the second line in each group of $n$ lines and so on, the arrangement being such that at any instant the energised group of $n$ lines is connected to the process control means so that for given values of the two parameters the process control means receives a $n$-bit digital input signal, dependent on the inter-connection between the energised line in the first set and the energised group of lines in the second set, the process control means serving to determine the length of a pulse used to control the process and at least one of said control means incorporating a function generator whereby said one control means serves to energise the lines in such a manner that if a graph is drawn of the length of the output pulse against the value of the appropriate parameter, the change in the parameter which is required to change the energised line is smallest where the required rate of change of the length of the output pulse is greatest, and greatest where the required rate of change of the length of the output pulse is least.

* * * * *